(12) United States Patent
Rutgers et al.

(10) Patent No.: US 10,103,649 B2
(45) Date of Patent: Oct. 16, 2018

(54) TRIBOELECTRIC POWER GENERATOR SYSTEM AND METHOD

(71) Applicant: KONINKLIJKE PHILIPS N.V., Eindhoven (NL)

(72) Inventors: Andrew Ulrich Rutgers, Eindhoven (NL); Mark Thomas Johnson, Eindhoven (NL); Alan James Davie, Cambridge (GB)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/535,156

(22) PCT Filed: Dec. 7, 2015

(86) PCT No.: PCT/EP2015/078743
§ 371 (c)(1),
(2) Date: Jun. 12, 2017

(87) PCT Pub. No.: WO2016/096492
PCT Pub. Date: Jun. 23, 2016

(65) Prior Publication Data
US 2017/0346416 A1 Nov. 30, 2017

(30) Foreign Application Priority Data

Dec. 15, 2014 (EP) .................. 14197924

(51) Int. Cl.
*G05F 1/656* (2006.01)
*H02N 1/04* (2006.01)
*H02M 3/156* (2006.01)
*H02M 7/06* (2006.01)

(52) U.S. Cl.
CPC ............. *H02N 1/04* (2013.01); *H02M 3/156* (2013.01); *H02M 7/06* (2013.01); *G05F 1/656* (2013.01)

(58) Field of Classification Search
CPC ........... H02N 1/04; G05F 1/656; H02M 11/00
See application file for complete search history.

(56) References Cited

U.S. PATENT DOCUMENTS

| | | |
|---|---|---|
| 8,519,677 B2 | 8/2013 | Post et al. |
| 2006/0143645 A1 | 6/2006 | Vock et al. |
| 2007/0255334 A1 | 11/2007 | Keimel et al. |
| 2011/0050181 A1 | 3/2011 | Post et al. |
| 2011/0221416 A1 | 9/2011 | Ivanov et al. |
| 2013/0140896 A1* | 6/2013 | Tzinker ............ H02M 3/04 307/43 |
| 2014/0056043 A1 | 2/2014 | Naito et al. |
| 2014/0159667 A1 | 6/2014 | Kim et al. |
| 2017/0236990 A1* | 8/2017 | Park ................ H01L 37/02 310/306 |

FOREIGN PATENT DOCUMENTS

| | | |
|---|---|---|
| CN | 103859688 A | 6/2014 |
| WO | 2008062377 A2 | 5/2008 |

* cited by examiner

*Primary Examiner* — Harry Behm

(57) ABSTRACT

A triboelectric power generator system uses a power converter to provide a controllable impedance between a triboelectric power generator and a load, in dependence on the triboelectric generator output. This enables improved power transfer even though the output generated by a triboelectric power generator can be irregular and fluctuates over time.

16 Claims, 6 Drawing Sheets

TRIBOELECTRIC POWER GENERATOR SYSTEM AND METHOD

CROSS-REFERENCE TO PRIOR APPLICATIONS

This application is the U.S. National Phase application under 35 U.S.C. § 371 of International Application No. PCT/EP2015/078743, filed on Dec. 7, 2015, which claims the benefit of European Application No. 14197924.5, filed Dec. 15, 2014. These applications are hereby incorporated by reference herein, for all purposes.

FIELD OF THE INVENTION

This invention relates to a triboelectric power generation system and method.

BACKGROUND OF THE INVENTION

The triboelectric effect is based on contact-induced electrification in which a material becomes electrically charged after it is contacted with a different material through friction. It has been proposed to make use of this charge flow to power mobile devices such as sensors and smartphones by capturing the otherwise wasted mechanical energy from such sources as walking, the wind blowing, vibration or ocean waves. Beyond the use as a power source, the triboelectric effect has been proposed for sensing without an external power source. Because the generators produce current when they are perturbed, they can be used to measure changes in flow rates, sudden movement, or even falling raindrops.

The triboelectric effect is based on a series that ranks various materials according to their tendency to gain electrons (become negatively charged) or lose electrons (become positively charged). This series is for example disclosed in A. F. Diaz and R. M. Felix-Navarro, A semi-quantitative tribo-electric series for polymeric materials: the influence of chemical structure and properties, Journal of Electrostatics 62 (2004) 277-290. The best combinations of materials to create static electricity are one from the positive charge list and one from the negative charge list (e.g. PTFE against copper, or FEP against aluminium). Rubbing glass with fur, or a comb through the hair are well-known examples from everyday life of triboelectricity.

In its simplest form, a triboelectric generator thus uses two sheets of dissimilar materials, one an electron donor, the other an electron acceptor. When the materials are in contact, electrons flow from one material to the other. If the sheets are then separated, one sheet holds an electrical charge isolated by the gap between them. If an electrical load is then connected to two electrodes placed at the outer edges of the two surfaces, a small current will flow to equalize the charges.

By continuously repeating the process, an alternating current can be produced. In a variation of the technique, the materials—most commonly inexpensive flexible polymers—produce current if they are rubbed together before being separated. Generators producing DC current have also been proposed. The volume power density may reach more than 400 kilowatts per cubic meter at an efficiency of more than 50%.

The power output can be increased by applying micron-scale patterns to the polymer sheets. The patterning effectively increases the contact area and thereby increases the effectiveness of the charge transfer.

Recently an emerging material technology for power generation (energy harvesting) and sensing has been developed which makes use of this effect as disclosed in Wang, Z. L., "Triboelectric Nanogenerators as New Energy Technology for Self-Powered Systems and as Active Mechanical and Chemical Sensors". ACS Nano: 131014091722005. doi:10.1021/nn404614z, 2013.

Based on this effect several device configurations have been developed of so-called triboelectric generators ("TEG"). Some devices operate in a contact mode, and others operate in a friction mode.

One configuration has been developed specifically for power generation from a shoe insole. This generates power from the steps taken by a user, and the generated power may for example be used for charging of mobile portable devices. The device comprises a multiple layer structure formed on a zig-zag shaped substrate. The device operates based on surface charge transfer due to contact electrification. When a pressure is applied to the structure, the zig-zag shape is compressed to create contact between the different layers, and the contact is released when the pressure is released. Details can be found in the article "Integrated Multilayered Triboelectric Nanogenerator for Harvesting Biomechanical Energy from Human Motiosn" of Peng Bai et. al. in ACS Nano 2013 7(4), pp 3713-3719.

Instead of using a contact and non-contact mode of operation, a TEG can operate in a sliding mode. A design which enables energy to be harvested from sliding motions is disclosed in the article "Freestanding Triboelectric-Layer-Based Nanogenerators for Harvesting Energy from a Moving Object of Human Motion in Contact and Non-Contact Modes" in Adv. Mater. 2014, 26, 2818-2824. A freestanding movable layer slides between a pair of static electrodes. The movable layer may be arranged not to make contact with the static electrodes (i.e. at small spacing above the static electrodes) or it may make sliding contact.

Another configuration that has been developed is a rotational disc TEG which can be operated both in contact or non-contact mode. Rotational disc TEGs typically consist of at least one rotor and one stator each formed as set of spaced circle sectors. The sectors overlap and then separate as the two discs rotate relative to each other. In such a rotating disc triboelectric generator, electricity is generated by the combinations of two main physical mechanisms: coupling between contact electrification (triboelectric charging) and rotational electrostatic induction (in-plane charge separation due to redistribution of electrical charges caused by the influence of nearby charges)

The limitations of early versions of segmentally structured disc TEGs were that the rotational and stationary triboelectric layers require deposition of metal electrodes and connection with electrical leads, leading to inconvenient operation of the rotational part. Furthermore intimate contact is mandatory to achieve efficient electricity generation, which results in possible material wear, wear particles, instability of output, and generally limited lifetime of the TEG.

A disk TEG with both groups of patterned electrodes attached onto a stationary disk, together with a freestanding triboelectric layer on a rotational disk can resolve these issues, as disclosed in Long Lin et al., Noncontact Free-Rotating Disk Triboelectric Nanogenerator as a Sustainable Energy Harvester and Self-Powered Mechanical Sensor. ACS Appl. Mater. Interfaces, 2014, 6 (4), pp 3031-3038.

With such a structure, there is no necessity for electrode deposition or electrical connection for the rotational part, which dramatically improves the operating facility of the energy harvester. Moreover, owing to the unique feature of this new electricity-generation mechanism, the non-contact free-rotating disk triboelectric nanogenerator (FRD-TEG) can be operated without friction after initial contact electrification, with little loss in performance but superior durability, because the surface triboelectric charges are preserved on insulator surfaces for hours.

There are still further designs of triboelectric generator, such as a double-arch shaped configuration based on contact electrification. A pressure causes the arches to close to make contact between the arch layers, and the arches returns to the open shape when the pressure is released. A triboelectric nanogenerator has also been proposed which is formed as a harmonic resonator for capturing energy from ambient vibrations.

The TEG's can for example generate triboelectricity up to area power densities levels of 670 W/m$^2$.

It will be clear that there are many different designs of TEMG device, each tailored to a specific mode of operation. Some examples are outlined and referenced above. In general, four different general modes of operation may be identified.

A first mode is a vertical contact-separation mode, in which two or more plates are brought into and out of contact by an applied force. This may be used in shoes, with the contact resulting from the pressure applied by the user stepping. The zig-zag shaped arrangement described and referenced above is an example.

A second mode is a linear sliding mode in which plates are made to slide relatively to each other to change the area of overlap. A rotational disk TEG discussed above is an example. This may be used in a wave energy harvesting system.

A third mode is a single electrode mode in which one surface is for example grounded for example a floor or road, and the movement influences only one layer.

A fourth mode is a freestanding triboelectric layer mode, which is designed for harvesting energy from an arbitrary moving object to which no electrical connections are made. This object may be a passing car, a passing train, or a shoe.

Triboelectric generators are designed to generate power very briefly in response to an applied motion. The character of the motion affects the voltage or current generated, and the optimal load to absorb the energy will vary with the motion.

SUMMARY OF THE INVENTION

The inventors have recognised that one problem with triboelectric generators is that this chaotic nature of the power generation makes it difficult to provide load matching between the power generation side and the load, which is desired to optimize or even maximize the power delivered to the load. There is therefore a need to optimize or even maximize the power which can be obtained from a triboelectric generator despite the variability in the power generated, which depends on the motion which is used to cause the power generation.

It is an object of the invention to at least partly solve this power transfer problem.

The invention is defined by the independent claims. The dependent claims provide advantageous embodiments.

According to the invention, there is provided a triboelectric power generator system, comprising:

a triboelectric generator which generates electrical power in response to movement;

a power converter for converting the electrical power from the triboelectric generator for application to a load; and a controller for controlling the power converter, wherein the controller is adapted to control the power converter to alter the impedance presented by the power converter to the triboelectric generator over time in dependence on the triboelectric generator output, thereby to control the output power, wherein the controller is adapted to control the power converter to alter the impedance presented by the power converter to the triboelectric generator during a time period corresponding to a single pulse of electrical power generation of the triboelectric generator.

This approach can be used to provide improved impedance matching between the triboelectric generator output and the power converter, and thereby improve power transfer to the load. The output power may for example be controlled to be a maximum output power, although it is also possible to control the power to be deliberately held back from a full power transfer. Thus, more generally, the output power is controlled to be optimised, for example taking account of the characteristics of the load. The impedance is controlled in order to achieve a desired power transfer characteristic, rather than simply being the result of controlling the power converter to achieve a desired conversion ratio, for example.

In the most basic definition of the invention, the load is not part of the generator system or the generation method. However, It can be part of the generator part of the system or method.

This invention relates in particular to the electrical processing of the signal generated by the triboelectric generator. The invention does not rely on any particular configuration of triboelectric generator, and can be applied to any configuration. The triboelectric generator can be of known design, and for example generates an alternating voltage waveform with a magnitude that depends on the strength of movement. Various designs of triboelectric generator that can be used with the invention are discussed herein above and also herein below.

Many different types of power converter may be operated using a method which implements control of the input impedance. For example, a boost converter has a roughly resistive I-V curve with respect to its on-time. By adjusting the on-time, the impedance presented by the power converter to the source can be adjusted in real time. Many different power conversion topologies allow some method of impedance control. The challenge for triboelectric applications is selecting the correct impedance during the energy delivery cycles in order to maximize the output power.

The power converter may comprise a switch mode power converter. The switch cycles can then be controlled to implement impedance control. The power converter may for example comprise a boost converter.

The controller is adapted to control the power converter to alter the impedance presented by the power converter to the triboelectric generator during a time period corresponding to a single pulse of electrical power generation of the triboelectric generator. In this way, an impedance function is created which has a desired shape during the course of each individual pulse of power generation. It is noted that triboelectric generators generally deliver such pulses of electrical power.

In a first set of examples, a movement sensor may be provided for detecting the movement which is used to generate the electrical power, wherein the controller is adapted to control the power converter in response to the movement sensor output. By sensing the movement (which may be a measure of displacement, velocity or acceleration for example), the nature of the generated power signal can be inferred, from which the most suitable impedance to present to the generator can be derived.

For example, a database of movement types and associated impedance functions may be provided, wherein the controller is adapted to select a movement type based on the movement sensor output. The sensed movement may in this way be interpreted as falling into a particular movement category, and an impedance function with respect to time can then be selected. Alternatively the speed of movement, acceleration or displacement can be mapped directly to a corresponding impedance value without any categorization into movement type.

In a second set of examples, the controller may be adapted to analyse the generated electrical power and determine a movement type, wherein the system again further comprises a database of movement types and associated impedance functions.

In this case, the generated electrical power is analysed to determine the nature of the signal rather than inferring this from a sensed movement. By way of example the controller may be adapted to analyse an initial voltage and/or current profile of a pulse of general electrical power in order to determine the movement type.

The rate of change of the initial voltage and/or current of a pulse of generated electrical power may for example be analysed in order to determine the movement type.

In another set of examples, a power point tracking system may be used for modulating the power converter input impedance and monitoring the power transfer, to determine a suitable power converter input impedance.

The system may comprise a shoe or floor-based power generation system, in which power is generated from a user applying a step pressure to the system. Steps made by user present a significant force (e.g. 500 N) which can thus be used to generate a significant amount of output power, for example for powering lighting or powering or charging mobile portable devices.

The controller may for example be adapted to detect a step frequency and apply an impedance setting mode which is dependent on the step frequency.

According to the invention, there is also provided a triboelectric power generation method, comprising:

generating electrical power in response to movement using a triboelectric generator;

converting the electrical power from the triboelectric generator to make it suitable for application to a load; and controlling the power converter to alter the impedance presented by the power converter to the triboelectric generator over time in dependence on the triboelectric generator output, thereby to control the output power, during a time period corresponding to a single pulse of electrical power generation of the triboelectric generator.

The movement which is used to generate the electrical power may be detected, and the power converter is then controlled in response to the detected movement. A movement type may then be determined and mapping may be carried out from a movement type to an associated impedance function. Alternatively, the power converter input impedance may be modulated and the power transfer monitored, to determine a suitable power converter input impedance. This implements power point tracking.

BRIEF DESCRIPTION OF THE DRAWINGS

Examples of the invention will now be described in detail with reference to the accompanying schematic drawings, in which.

DETAILED DESCRIPTION OF THE EMBODIMENTS

The invention provides a triboelectric power generator system which uses a power converter to provide controllable impedance between a triboelectric power generator and a load, in dependence on the triboelectric generator output. This enables improved power transfer even though the output generated by a triboelectric power generator can be irregular and fluctuate over time.

Figure 1:
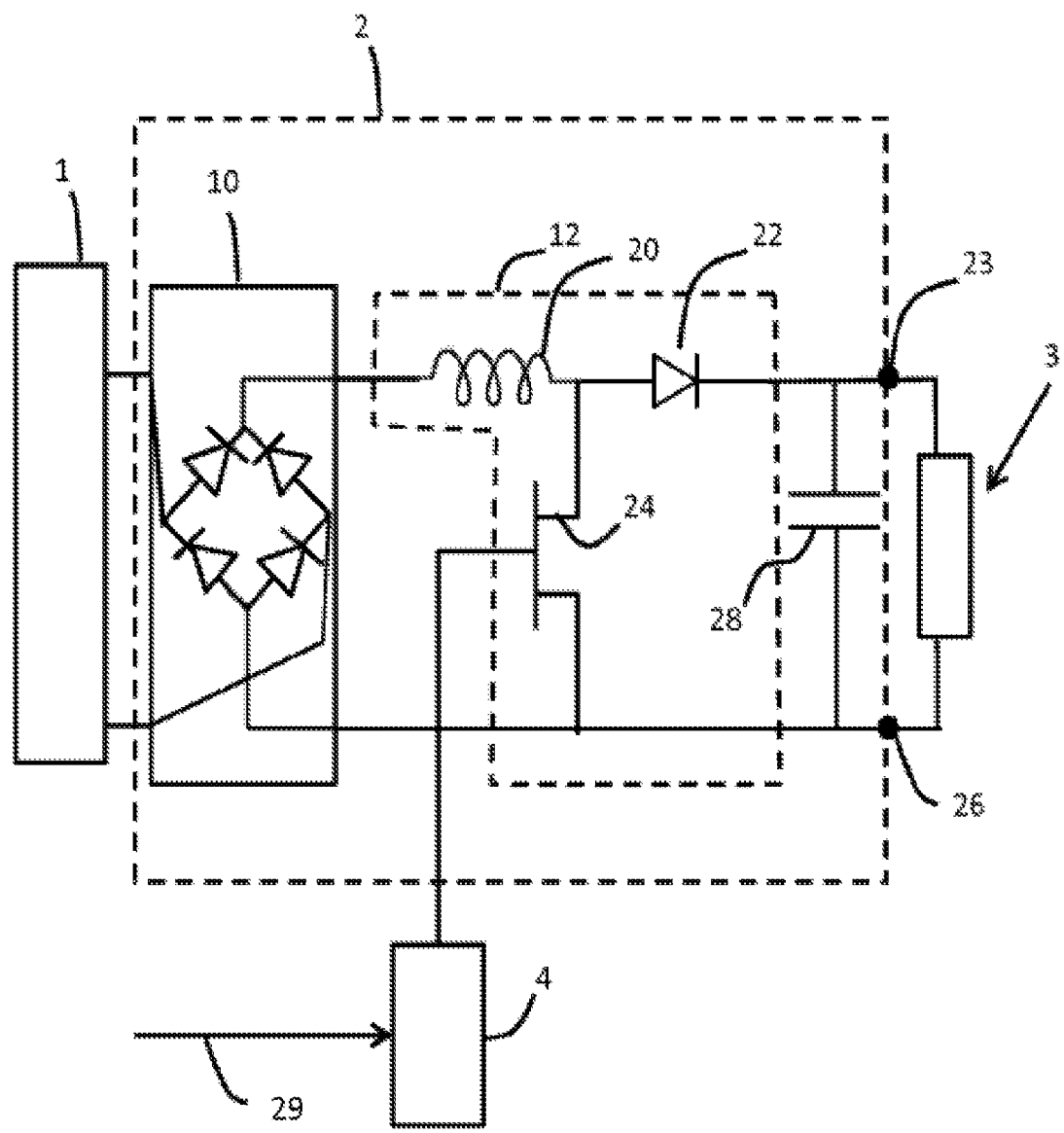
FIG. 1 shows a first example of a triboelectric power generator system.

FIG. 1 shows a first example of a possible triboelectric power generator system, based on boost converter for providing impedance control.

The system comprises a triboelectric generator 1 which generates electrical power in response to movement.

The triboelectric generator is of known design, and for example generates an alternating voltage waveform with a magnitude that depends on the strength of movement. Various designs of triboelectric generator are discussed above. This invention relates in particular to the electrical processing of the signal generated by the triboelectric generator. The invention does not rely on any particular configuration of triboelectric generator, and can be applied to any configuration. In particular, all tribolelectric generators provide an output which is pulsed in nature, and which does generally does not have a clean sinusoidal amplitude over time.

A power converter 2 is for converting the electrical power from the triboelectric generator 1 for application to a load 3. A controller 4 is used to control the power converter 2, wherein the controller is adapted to control the power converter to alter the impedance presented by the power converter 2 to the triboelectric generator 1 in dependence on the triboelectric generator output.

The power converter 2 comprises a full bridge diode rectifier 10 which supplies a rectified voltage to a DC-DC boost converter 12 providing voltage boosting dependent on a required impedance level to be presented to the triboelectric generator 1, under the control of the controller 4. The boost converter output is provided to the load 3. In other examples, a half bridge rectifier may be used, or alternatively the generator 1 may deliver a DC output.

The boost converter comprises an inductor 20 between the input and the anode of a first (flyback) diode 22, the cathode of the first diode 22 being connected to a first output terminal 23. A transistor 24 functions as a control switch which is connected between the anode of the first diode 22 and a second output terminal 26. The transistor 24 is switched by the controller 4. FIG. 1 also shows a smoothing capacitor 28 connected across the load 3.

The switching of the transistor 24 controls the operation of the boost converter, in known manner. In particular, by varying the duty cycle, the voltage boost factor is controlled. The duty cycle also varies the input impedance of the boost converter 12, and this invention makes use of the control of the power converter with the primary aim of controlling the input impedance of the power converter 2, rather than controlling the output voltage.

The controller 4 thus functions to convert a control signal 29 which indicates a desired input impedance into a required duty cycle to be applied to the transistor 24.

By providing impedance matching between the power converter 2 and the triboelectric generator 1, the power transfer to the load can be maximized.

The boost converter is for example designed to deliver current to an output which is held at a stable voltage by the capacitance of the load (or an additional storage capacitor). At least at the scale of the duration of the pulses of triboelectric power generation, the output voltage remains constant. In particular, the output capacitance will hold substantially more energy than is delivered in the power delivery cycle—making the output voltage roughly stable.

The circuit can be used to provide power to a variety of different possible loads. Examples include small circuitry such as a master control unit of a device ("MCU") or LED illumination.

The type of power converter is selected for appropriate conversion ratios between the input and output. At a given power converter setting (such as the on period T_on or the duty cycle) and with a stable output voltage stored on a large output capacitance, a range of input voltages can be converted, but they will all result in different output currents provided to the load.

The input impedance of a boost converter of the type shown in FIG. 1 relates to input time on as R_in=2L/$t_{on}$.

L is the inductance, and $t_{on}$ is the on period for the main control transistor. The parameter $t_{on}$ is a typical control variable for a boost converter. The impedance can be controlled effectively each conversion cycle, with some lag due to the input capacitance.

Having substantially different impedance after 10 converter cycles is generally easily attainable—so a typical boost converter operating at 100 kHz may have a new impedance at 10 kHz or every 0.1 ms quite easily.

This means an impedance profile can be created which adapts during the course of an individual power generation pulse. For example, the impact made by a step on a floor may have a duration of around 0.1 s. Based on a power converter with a 100 kHz cycle frequency, this enables 1000 impedance adjustments during the course of the single power generation pulse. Thus, a desired impedance profile can be created which adapts during the course of the power pulse generation. The same applies to other uses, such movement to follow waves (with a longer pulse duration) and compression caused by passing cars (with a shorter pulse duration).

Typically, the impedance level is controlled at least 10 times and more, preferably at least 20 times, during the course of a power generation pulse. In this way, an essentially analogue impedance function is created. The power generation pulse typically has a duration of between 1 ms (for example the time for a car to advance 5 cm at 50 m/s) and 10 s (for example a water wave period).

The nature of the mechanical movement being used to generate the triboelectric energy will determine both the type and details of the most suitable power converter and also the resolution of the impedance function, and the way the impedance function is generated. As will be appreciated from the examples below, an impedance function may be created entirely in real time in response to the nature of the movement, or else the nature of the movement is used to selected one of a set of previously determined impedance functions.

Other types of power converter topology also adjust their input impedance as a function of the converter settings.

The example of FIG. 1 makes use of a boost converter. However, the same approach can be used for switch mode converters more generally, such as buck or buck-boost converters.

As shown in FIG. 1, a control signal 29 is used to control the power converter. This control signal is dependent on the output from the triboelectric generator. It can be obtained in a number of different ways.

Figure 2:
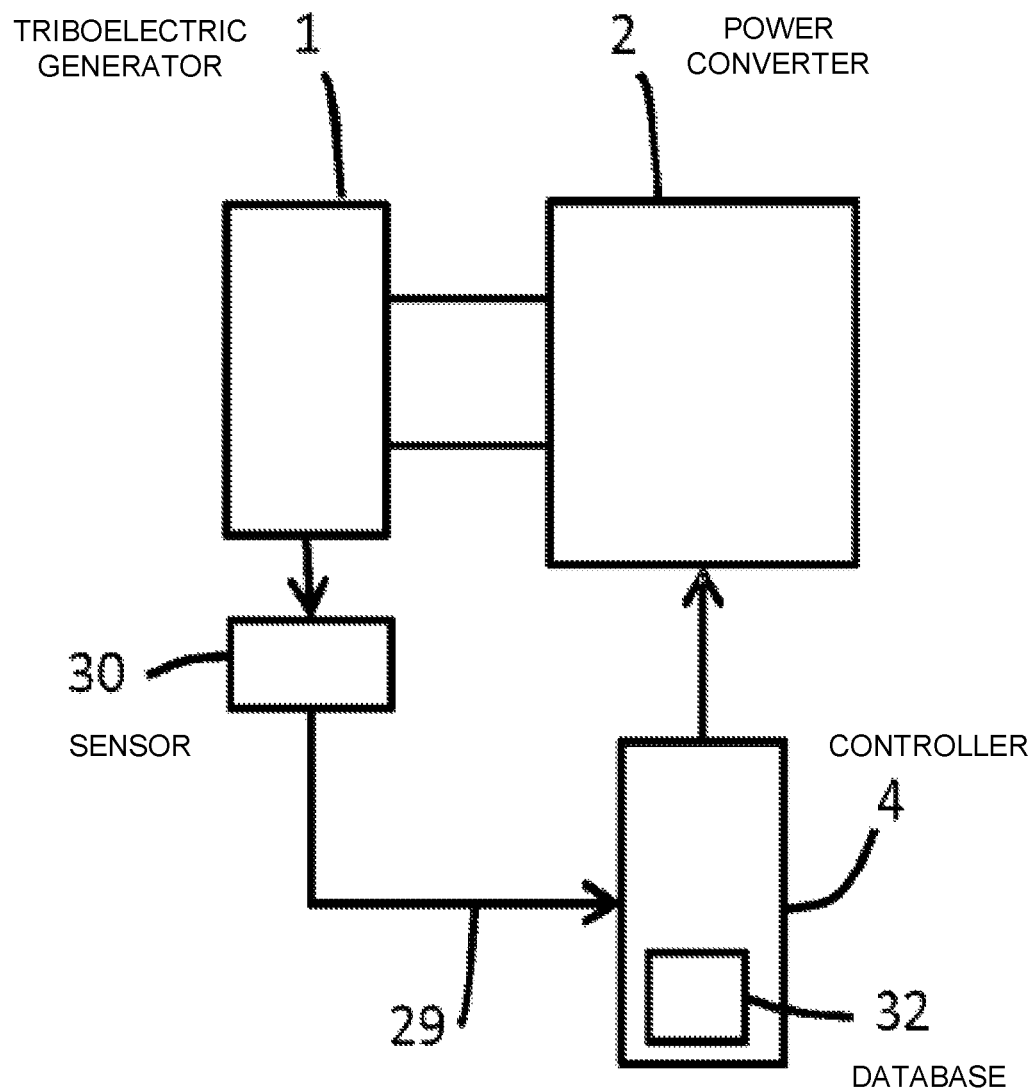
FIG. 2 shows a second example of a triboelectric power generator system.

A first example is shown in FIG. 2, in which a sensor 30 is used to detect the motion which is used by the triboelectric generator to generate power. The sensor output functions as the control signal 29 which is input to the controller 4, and is thus used to tune the power converter to operate at the correct impedance. The controller 4 may implement a direct relationship between the speed or displacement of the movement to a desired impedance value, or else it may select one of a set of predetermined impedance functions (with respect to time).

For this purpose, the controller 4 may include a database 32 of movement types and associated impedance functions. The sensed movement may for example be interpreted as falling into a particular movement category, and an impedance function with respect to time can then be selected.

Figure 3:
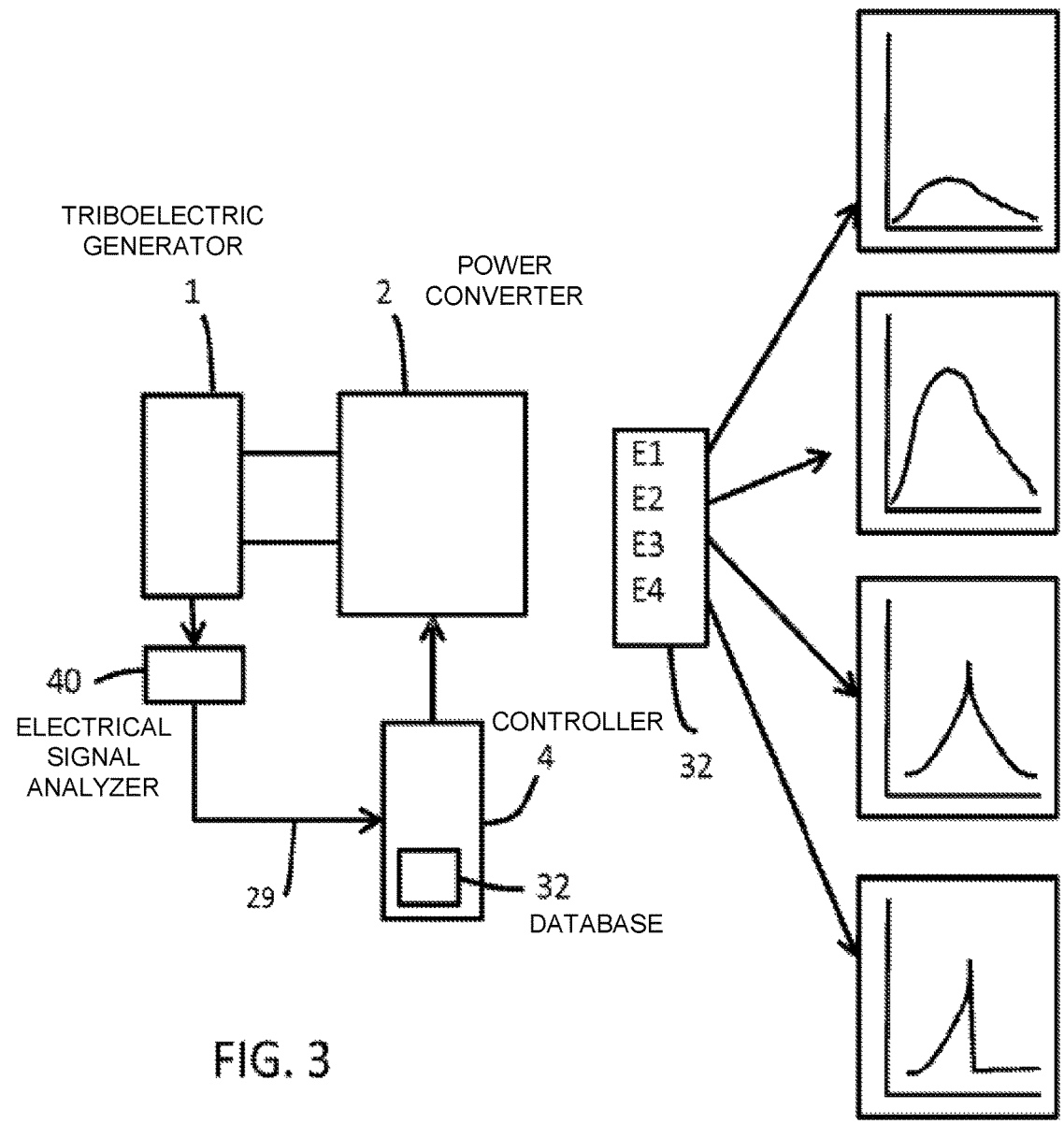
FIG. 3 shows a third example of a triboelectric power generator system.

Instead of using a movement sensor, the controller 4 may derive a movement type from the characteristics of the signal output from the triboelectric generator. This approach is shown in FIG. 3. The difference compared to FIG. 2 is that instead of a movement sensor, an electrical signal analyser 40 is provided. This may track the voltage output from the triboelectric generator 1, or the current or the power.

The operation of the database 32 is also shown schematically in FIG. 3. There are database entries values shown, E1 to E4.

Each entry for example represents a particular range of values of the initial rate of change of voltage, or a particular range of values of the time required for a certain voltage to be reached following the start of a generated power pulse.

The entries then determine which of several characteristic motions are causing the generation.

For example, dropping a device carrying the triboelectric generator may create a very high value of dV/dt, while pushing may create a slower value of dV/dt. The determined characteristics are then used to select which impedance profile to use. Four such impedance profiles are shown, each comprising a function of impedance (y-axis) versus time (x-axis). The impedance profile aims to optimize the energy extracted from the movement. The total time on the a-axis corresponds the duration of a single pulse of energy delivered by the triboelectric generator, which in turn corresponds to one pulse of a cyclic physical motion. The controller converts the desired impedance profile into a corresponding duty cycle function which can then be applied to the main transistor of the power converter. Of course, current or power profiles may be used to select the desired impedance function instead of voltage profiles.

FIG. 4 shows two examples of possible voltage versus time functions which may be expected from a triboelectric generator, in response to different movement types.

Figure 4A:
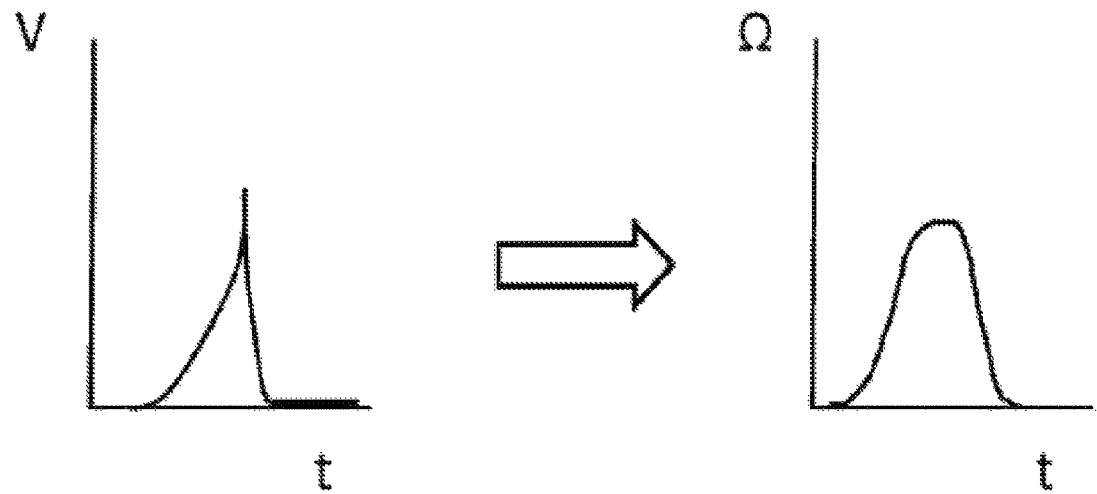
FIG. 4 shows mappings between two different movement types and associated impedance functions.

FIG. 4(a) shows the voltage waveform generated when a large and rapid pressure is applied to the triboelectric generator. It is characterised by a large initial rate of change of voltage. This is converted to a corresponding impedance function. This may match the shape of the voltage function, but adapted so that it represents an impedance function which can in practice be implemented by control of the power converter.

Figure 4B:
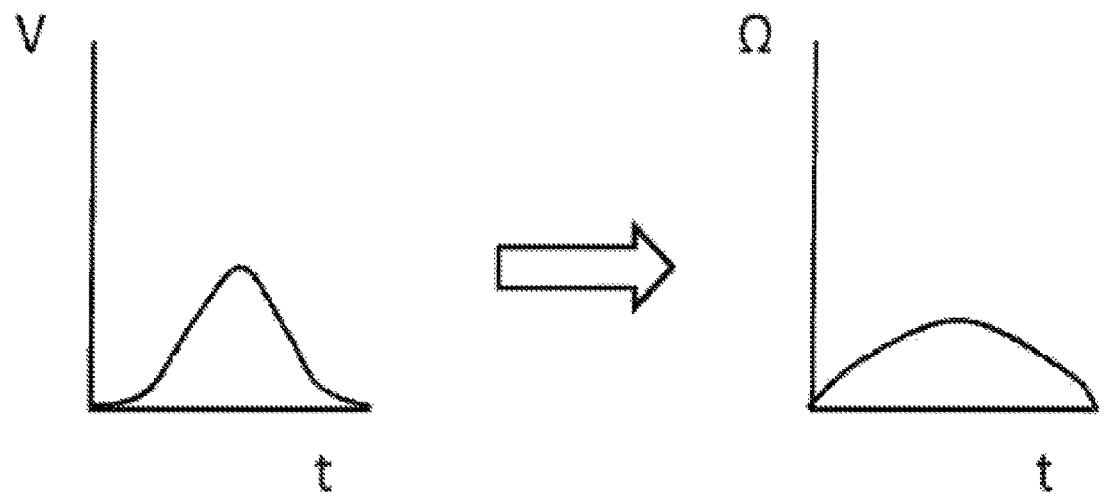

FIG. 4(b) shows the voltage waveform generated when a smaller and slower pressure change is applied to the triboelectric generator. It is characterised by a lower initial rate of change of voltage. This is again converted to a corresponding impedance function.

Figure 5:
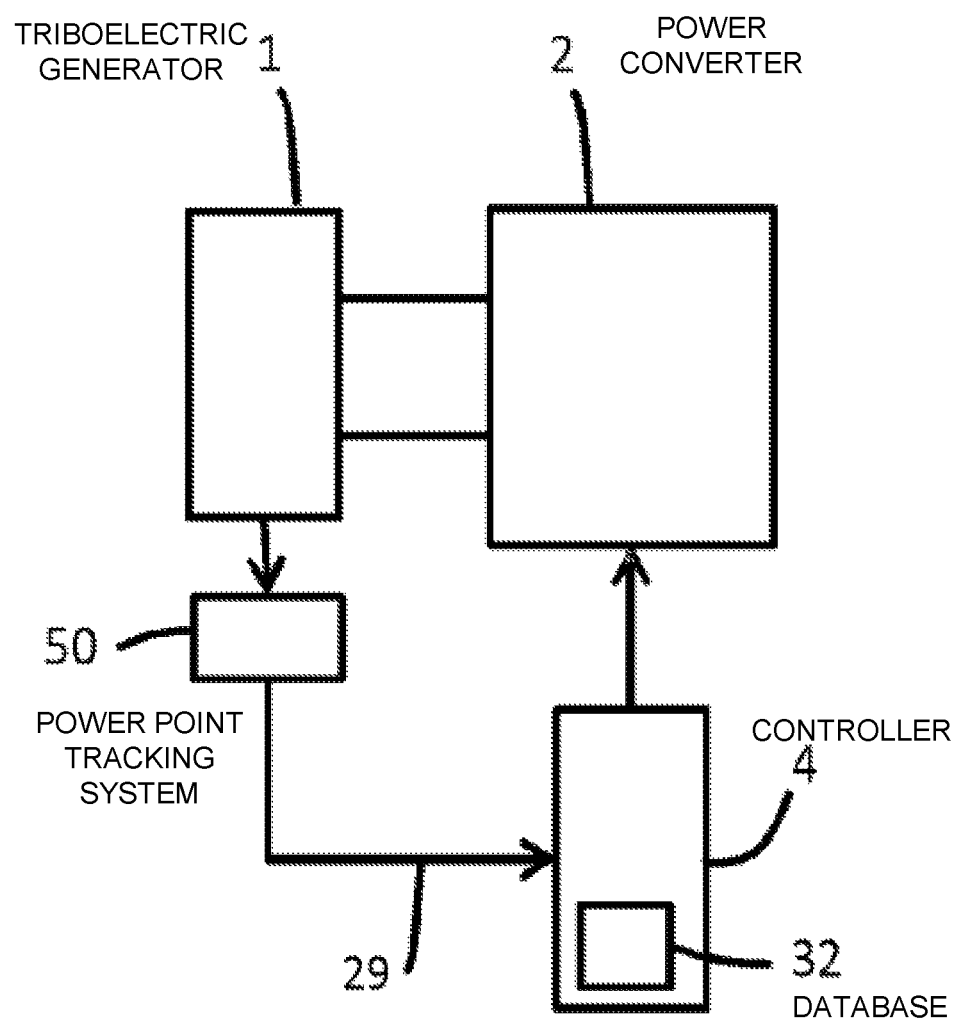
FIG. 5 shows a fourth example of a triboelectric power generator system.

An alternative approach for determining the most suitable impedance function is to use power point tracking. This approach is shown in FIG. 5. The difference compared to FIG. 2 is that instead of a movement sensor, a power point tracking system 50 is provided.

Power point tracking is known for controlling the load resistance applied to solar cells in order to maximize power. The same approach can be applied to the triboelectric generator output in order to determine the appropriate load to be presented by the power converter.

The system 50 in combination with the controller 4 modulates the power converter input impedance and monitors the power transfer, to determine a suitable power converter input impedance.

For example, the input impedance of the converter may be modulated with sine or square wave. The impedance values which give rise to the greatest power can be used to determine the impedance level that should be applied.

The power transfer may be measured by monitoring the output of the triboelectric generator, and thus the converter input. At a basic level, the highest possible power is desired, namely I×V. This could be measured at the input ($I_{in}*V_{in}$) or at the output ($I_{out}*V_{out}$), or a calculation may be carried out which is more specific to the particular converter. A simple system may vary $t_{on}$ (the converter control parameter) to find the highest value of $I_{in}*V_{in}$. More elaborate routines are possible.

If the generating movement is especially fast, the value of $t_{on}$ may be varied over time (for example with different $t_{on}$ values for subsequent cycles) in a pattern previously observed to result in a higher output power. This then avoids the need for real time processing to derive all of the impedance adjustments. This pattern may then be varied One example of possible use of the system is as part of a shoe or floor-based power generation system, in which power is generated from a user applying a step pressure to the system.

One example of the type of triboelectric generator which can be used for this type of system has been discussed and referenced above. Generally, a shoe or floor-based system will operate with a generator designed for a contact, non-contact cycle. The contact part of the cycle is induced by the step pressure. This type of system may be used in dance halls or clubs for example to generate power for the lighting. The triboelectric generation is more effective at higher pressures, so use in a shoe or under a carpet, mat or rug is an effective use of the power generation system.

As explained above, the system may include one or more look-up tables for different types of motion. For a shoe or floor based triboelectric power generation system, the expected load profile (and corresponding impedance profile) may for example default to a profile associated with walking as this will be the dominant load situation.

There may however be situations where the user moves into another mode (running, dancing, etc.) and in general will maintain this new mode for a prolonged period, for example at least several minutes. In this case, a mode shift could be induced for example if the new motion is detected for e.g. 2 or more steps. Different modes may be associated with different look up tables with different impedance function profiles.

The impedance profile may also be selected taking into account the step frequency. In general, the rate of stepping is lower during walking than during running. For this reason, the system may learn to adjust the mode in dependence upon the frequency of stepping. This would work best in a shoe based system, as the power generation system is associated with an individual user rather than with a general area which may be shared between different users each possibly behaving in different ways.

The mode choice may also depend on phase information, and corresponding pattern recognition. In general, the rate of stepping is fairly regular during walking and during running, but the phase changes during dancing (e.g. for a quickstep dance slow, quick, quick, slow etc.). For this reason, the system may learn to adjust the mode dependent upon the pattern of the stepping. For the quickstep, the system will potentially switch every 2 paces from a look-up table entry "Quick" (where a faster impact of the foot is expected) to a look-up table entry "Slow" (where a lighter impact of the foot is expected).

Again, this will work best in a shoe based system where the behaviour of one user is tracked.

Figure 6:
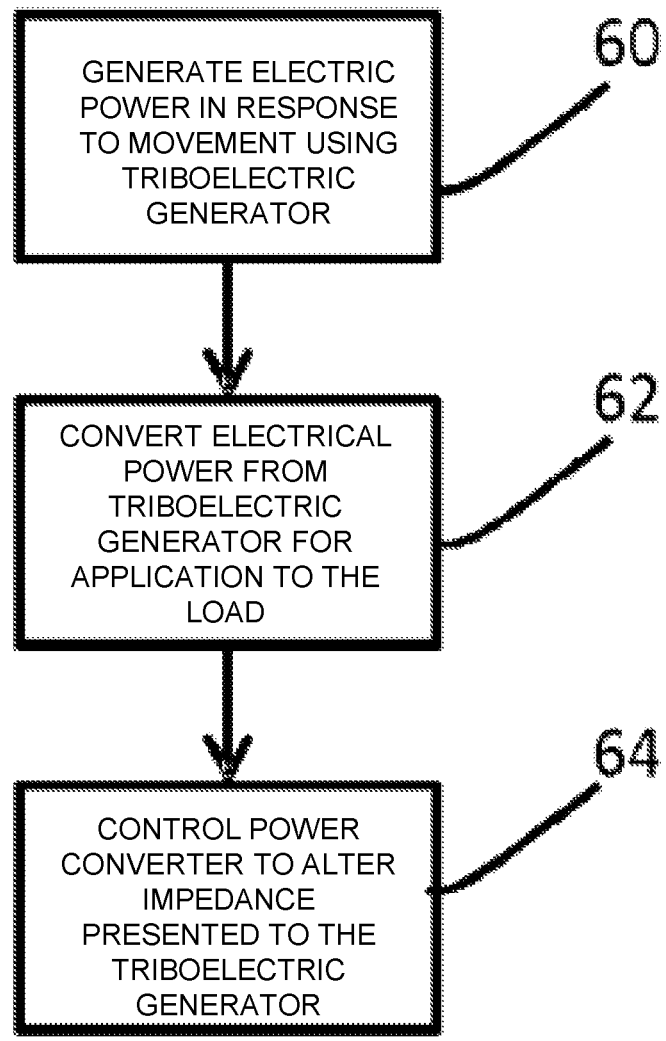
FIG. 6 shows a triboelectric power generation method.

FIG. 6 shows a triboelectric power generation method which can be implemented by the various possible system designs described above. The method comprises generating electrical power in step 60 in response to movement using a triboelectric generator. In step 62, the electrical power from the triboelectric generator is converted for application to the load, and in step 64 the power converter is controlled to alter the impedance presented by the power converter to the triboelectric generator in dependence on the triboelectric generator output.

As explained above, the invention compensates for the shape of an energy pulse from a triboelectric generator. One general approach is to provide power point tracking sufficiently rapidly to follow the shape of the pulse. Another general approach is to store a database of informtion relating to different pulse shapes, where the different pulse shapes correspond to different types of motion. In the latter case, the type of motion is deteted or deduced and then the corresponding information obtained from the database. The information is then used to control the impedance during the pulse of received energy.

These two approaches may be combined, for example by having a database of stored patterns, but implementing power point tracking as well to rescale these patterns or to superimpose additional control based on the power point tracking.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

In summary, the invention relates to a triboelectric power generator system that uses a power converter to provide a controllable impedance between a triboelectric power generator and a load, in dependence on the triboelectric generator output. This enables improved power transfer from the generator to the load even though the output generated by a triboelectric generator can be irregular and fluctuate over time.

The invention claimed is:

1. A triboelectric power generator system for providing an output power to a load, comprising:
   a triboelectric generator for generating an electrical power output in response to movement;
   a power converter for converting the electrical power output from the triboelectric generator to the output power for application to the load; and a controller for controlling the power converter; and
   a movement sensor for detecting the movement which is used to generate the electrical power,
   wherein the controller is adapted to control the power converter, in response to the movement sensor output, to alter the impedance presented by the power converter to the triboelectric generator over time in dependence on the triboelectric generator electrical power output, thereby to control the output power,
   wherein the controller is adapted to control the power converter to alter the impedance presented by the power converter to the triboelectric generator during a time period corresponding to a single pulse of electrical power generation of the triboelectric generator.

2. A system as claimed in claim 1, wherein the power converter comprises a switch mode power converter.

3. A system as claimed in claim 1, further comprising a database of movement types and associated impedance functions, wherein the controller is adapted to select a movement type based on the movement sensor output.

4. A system as claimed in claim 1, further comprising a power point tracking system for modulating the power converter input impedance and monitoring the power transfer, to determine a suitable power converter input impedance.

5. A system as claimed in claim 1, further comprising a shoe or floor-based power generation system, in which power is generated from a user applying a step pressure to the system.

6. A system as claimed in claim 5, wherein the controller is adapted to detect a step frequency and apply an impedance setting mode which is dependent on the step frequency.

7. A triboelectric power generation method, comprising:
   generating an electrical power output in response to movement using a triboelectric generator;
   converting the electrical power output from the triboelectric generator to an output power for application to a load using a power converter;
   detecting the movement which is used to generate the electrical power output; and
   controlling the power converter, in response to the detected movement, to alter the impedance presented by the power converter to the triboelectric generator over time in dependence on the triboelectric generator electrical power output, thereby to control the output power during a time period corresponding to a single pulse of electrical power generation of the triboelectric generator.

8. A method as claimed in claim 7, comprising detecting a movement type and mapping from a movement type to an associated impedance function.

9. A method as claimed in claim 7, further comprising modulating the power converter input impedance and monitoring the power transfer, to determine a suitable power converter input impedance.

10. A triboelectric power generator system for providing an output power to a load, comprising:
    a triboelectric generator for generating an electrical power output in response to movement;
    a power converter for converting the electrical power output from the triboelectric generator to the output power for application to the load; and a controller for controlling the power converter; and
    a database of movement types and associated impedance functions,
    wherein the controller is adapted to select a movement type based on a parameter,
    wherein the controller is adapted to control the power converter to alter the impedance presented by the power converter to the triboelectric generator over time, based on the selected movement type and associated impedance function, thereby to control the output power,
    wherein the controller is adapted to control the power converter to alter the impedance presented by the power converter to the triboelectric generator during a time period corresponding to a single pulse of electrical power generation of the triboelectric generator.

11. A system as claimed in claim 10, wherein the controller is further adapted to analyse the generated electrical power, wherein the parameter is the generated electrical power.

12. A system as claimed in claim 11, wherein the controller is adapted to analyse an initial voltage and/or current profile of a pulse of the generated electrical power in order to determine the movement type.

13. A system as claimed in claim 12, wherein the controller is adapted to analyse the rate of change of the initial voltage and/or current of a pulse of the generated electrical power in order to determine the movement type.

14. A system as claimed in claim 10, further comprising a movement sensor for detecting the movement which is used to generate the electrical power, wherein the parameter is a sensor output.

15. A system as claimed in claim 10, further comprising a power point tracking system for modulating the power converter input impedance and monitoring the power transfer, to determine a suitable power converter input impedance.

16. A system as claimed in claim 10, further comprising a shoe or floor-based power generation system, in which power is generated from a user applying a step pressure to the system.

* * * * *